Dec. 30, 1930.  W. B. FLANDERS  1,786,987
GOVERNOR
Filed Jan. 22, 1927  2 Sheets-Sheet 1

WITNESSES:
E. Lutz
M. Tirhon

W.B. Flanders
INVENTOR

BY  a. B. Reavis
ATTORNEY

Dec. 30, 1930.  W. B. FLANDERS  1,786,987
GOVERNOR
Filed Jan. 22, 1927   2 Sheets-Sheet 2

WITNESSES:
E. Lutz
M. Wilson

W. B. Flanders
INVENTOR

BY  A. B. Reavis
ATTORNEY

Patented Dec. 30, 1930

1,786,987

UNITED STATES PATENT OFFICE

WARREN B. FLANDERS, OF PHILADELPHIA, PENNSYLVANIA, ASSIGNOR TO WESTINGHOUSE ELECTRIC & MANUFACTURING COMPANY, A CORPORATION OF PENNSYLVANIA

GOVERNOR

Application filed January 22, 1927. Serial No. 162,846.

My invention relates to governing apparatus for prime movers, more particularly to governors for elastic fluid turbines, and has for its object the provision of apparatus of the character designated which shall be capable of effecting a multiplicity of non-throttling positions of motive fluid admission valves of the turbine with a minimum number of admisson valves.

More particularly the object of my invention is the provision of governing apparatus for an elastic fluid turbine having primary, secondary and tertiary admission valves, each capable of passing a volume of motive fluid differing from the other, and wherein means are provided for opening and closing said valves in sequence, together with means for changing the sequence of opening and closing of the valves.

Apparatus embodying features of my invention is illustrated in the accompanying drawings forming a part of this application wherein.

As is well known in the art to which my invention relates, the most desirable method of admitting elastic fluid, more particularly steam, to a turbine or other steam-operated apparatus is through an unobstructed valve opening wherein the minimum of pressure drop through the valve occurs. Where the passage through the valve opening is restricted so as to throttle the steam and cause a substantial pressure drop thereacross, a considerable percentage of the available energy in the steam is given up in the throttling process. It has heretofore been known to provide turbines with a plurality of valves which would open and close in sequence in accordance with the load requirement on a turbine and thus obtain a plurality of non-throttling positions. In order to compensate for any considerable variation in load this has required a large number of valves entailing complicated mechanism to effect their operation.

So far as I am aware, there has been no apparatus provided wherein the sequence of opening and closing of the valves could be varied, once it was established. The result of this condition has been that the only non-throttling position obtainable with such apparatus has been when the load on the turbine was such as to require the total volume of steam capable of being passed when one or more of the valves was wide open. For example, if a turbine was provided with three valves there would only be three non-throttling positions.

In accordance with my invention I provide a turbine with a plurality of valves each capable of passing, in wide open position, a volume of motive fluid differing from the others, and provide means for readily varying the sequence of operation of the valves. With a turbine provided with my improved apparatus and having primary, secondary and tertiary valves, they may be arranged to open in the order given or they may be changed to open in the reverse order, as tertiary, secondary and primary. Again they may be changed to open in the order of secondary, primary and tertiary. Thus I am able to obtain seven non-throttling positions with only three valves whereas in apparatus heretofore known to me there could only be three non-throttling positions.

Figure 1:
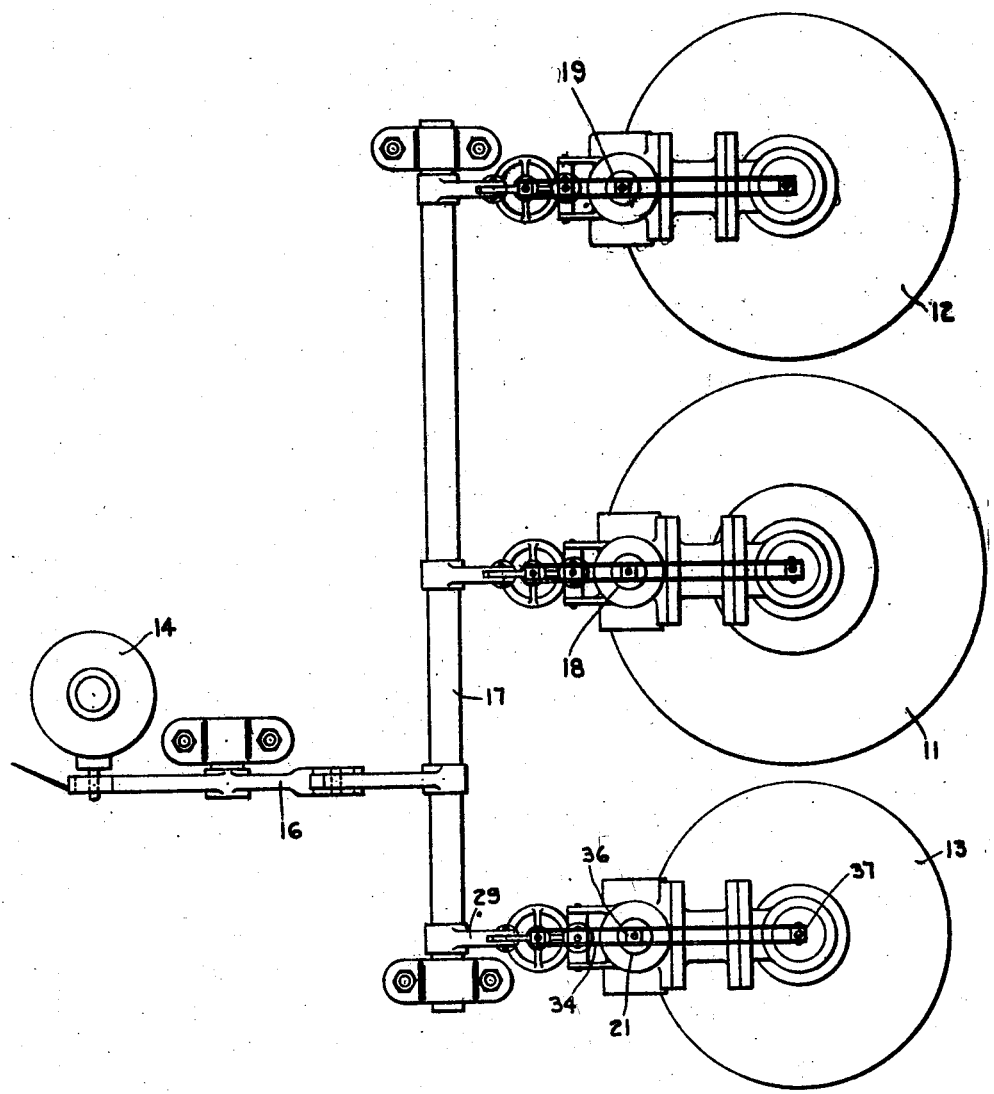
Fig. 1 is a plan view of my improved governing apparatus as applied to a turbine.

Referring now to the drawing for a more detailed description of my invention, I show in Fig. 1 a primary valve 11, a secondary valve 12 and a tertiary valve 13 for the admission of motive fluid to an elastic fluid turbine or other fluid motor. The opening and closing of the primary, secondary and tertiary valves 11, 12 and 13 is controlled by a speed responsive governor 14 through a lever 16, a rock shaft 17 and through fluid pressure operated relays 18, 19 and 21, respectively. It will be noted from the drawing, Fig. 1, that the primary, secondary and tertiary valves are each of different sizes and capable of passing different volumes of motive fluid in wide open position. The fluid pressure operated relays are similar in construction and operation and a description of the relay 21 shown in section in Fig. 2 will suffice for the three.

Figures 2, 3, 4:
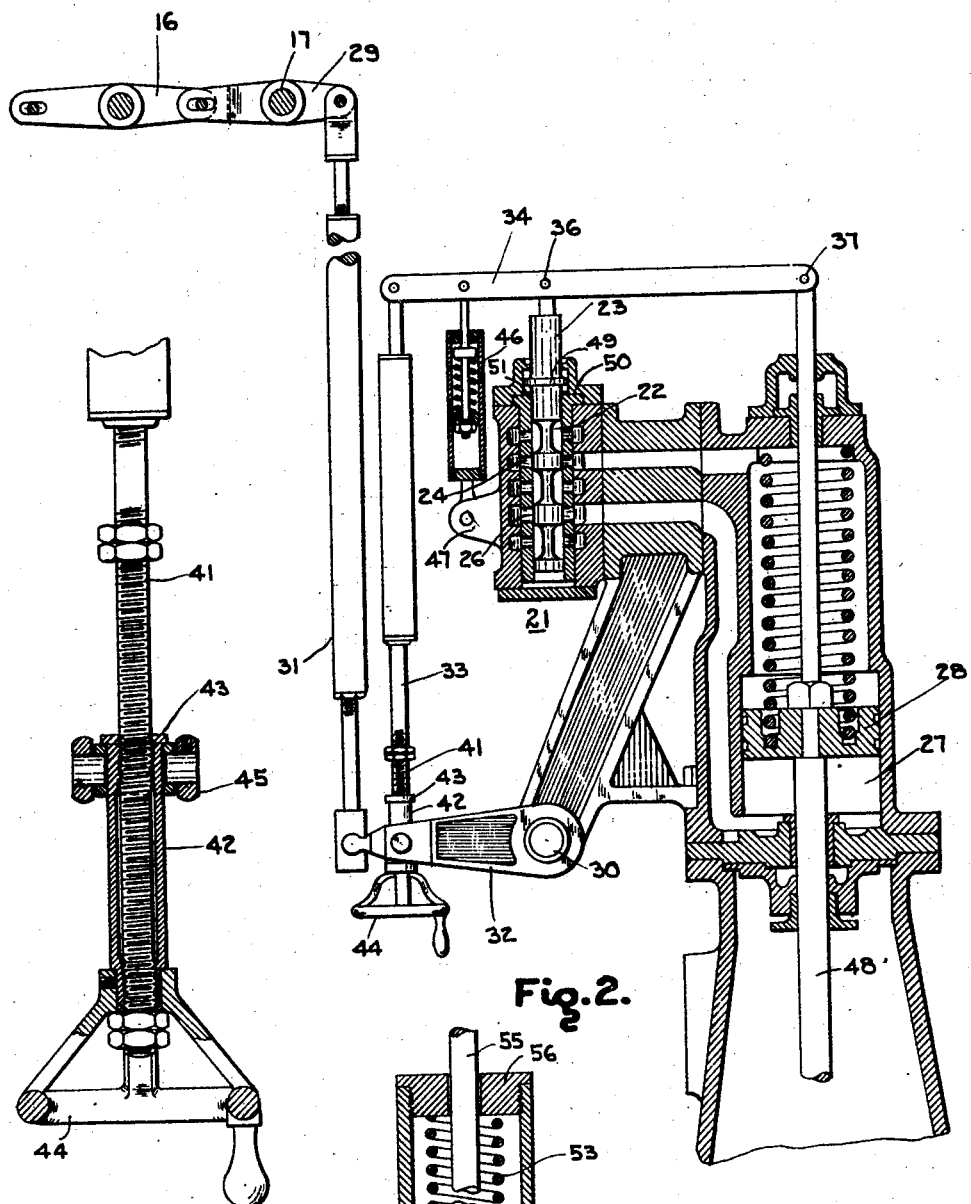
Fig. 2 is a side elevation, with parts in section, of the apparatus shown in Fig. 1; and, Figs. 3 and 4 are sectional views drawn to a larger scale of details of my invention.

Referring now particularly to Fig. 2, the relay 21 is the ordinary fluid relay well known in the art and comprises a valve chamber 22 having a valve 23 disposed therein and ports 24 and 26 leading to the upper and lower ends respectively of an operating cylinder 27. The valve member 23 has a stop 49 abutting against the abutment 51 for limiting downward movement of valve 23. The operating cylinder 27 has a power piston 28 disposed therein and connected by rod 48 to the tertiary admission valve 13. The rock shaft 17 has an arm 29 connected to a link 31, which is, in turn, connected to a pivot member 32 pivoted at 30 to a stationary part. The pivot member 32 is connected to a link 33 which is connected to a floating lever 34. The floating lever 34 is connected, at 36 to the valve 23 and, at 37, to the power piston 28.

The link 33 is resiliently extensible and may be constructed as shown in Fig. 4. The lower part 52 of link 33 is provided at its upper end with a tubular casing 54. The lower end of part 55 of the link extends within the casing 54 through the end member 56 thereof, and has a shoulder or abutment 57 secured thereon. A spring 53 is in compression between the shoulder 57 and end member 56. This spring normally holds the link contracted but permits extension thereof when stop 49 abuts against abutment 51. A key pin 58 may be provided between abutment 57 and casing 54 to prevent rotation of the latter upon turning the hand wheel 44.

Upon a downward movement of the arm 29 of the rock shaft, the link 33 and the floating lever 34 are pulled downwardly, the latter taking with it the valve 23 and causing an upward movement of the power piston 28 and an opening movement of the admission valve 13 as is well understood in the art. Upon an upward movement of the rock shaft arm 29, the floating lever 34 and valve 23 are moved upwardly effecting a downward movement of the power piston 28 and a closing movement of the admission valve 13.

The lower end of the link 33 is threaded at 41 and a sleeve 42 having a collar 43 at the upper end thereof is screwed over the threaded portion and may have its position varied on the link as by a hand wheel 44. The sleeve 42 has a sliding fit in a block 45, Fig. 3, which is pivotally connected to the pivot member 32. In order to compensate for the weight of the various linkages and levers and to insure that the lever 34, when freed from restraint shall assume a position to cause the relay 21 to close the admission valve 13, I provide an elastic link 46 between said lever 34 and a stationary abutment 47.

The elastic link 46 exerts an upward force on the lever 34 so that, when freed from other restraint, the lever is forced upwardly to a position for causing the relay to close the admission valve 13. When the governor 14 effects a downward movement of the arm 29 and the link 31, the lower end of the sleeve 42 is caught by the block 45, pulling the link 33 and lever 34 downwardly so as to effect an opening movement of the admission valve 13.

After the first valve has been completely opened, further opening movement of the governor 14 will continue to pull the sleeve 42 downwardly, while the stop 49 of valve 23 will prevent further downward movement of lever 34. This will cause an extension of link 33, permitted by the spring 53 above described.

When the arm 29 and link 31 are moved upwardly by the governor 14, the link 33 is caused to follow the link 31 by the elastic link 46 until the limit of extension of said elastic link is reached at which time the lever 34 has moved the relay valve to a position insuring closing of the admission valve 13. If further upward movement of the arm 29 occurs, the block 45 moves upwardly on the sleeve 43 without effecting any movement thereof. It will thus be seen that the sleeve 42, block 45 and pivot member 32 form, in effect, a lost motion connection between the link 31 and the lever 34. By screwing the sleeve 42 up or down on the threaded portion 41 of the link 33, the time of opening and closing of the admission valve 13 may be determined with respect to movements of the governor 14.

The relays 18, 19 and 21 being similar in construction, it may be seen that by varying the relative positions of the sleeves 42 of the links 33, the relative time of opening and closing of the admission valve may be determined in any order of sequence. If the normal load on the turbine, for example, is such as to utilize the full volume of steam capable of passing the primary and secondary valves in wide open position, the sleeves 42 may be adjusted to a position insuring opening of these valves, in sequence or together, before the tertiary valve opening. If the normal load is such as to require the volume of steam capable of being passed with the secondary and tertiary valves open, the sleeves 42 associated with the relays 19 and 21 may be arranged so as to insure the opening of said valves ahead of the primary valve. It may thus be seen that with my improved apparatus any desired sequence of opening of the valves may be realized and said sequence may be adjusted so as to take care of a normal load on the turbine with the admission valves in wide open position, avoiding undesirable losses due to throttling of the steam.

From the foregoing, it will be apparent that I have devised an improved valve operating mechanism for steam turbines having a plurality of admission valves wherein the non-throttling positions of said admission valves may be multiplied beyond the number of said valves.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. In a governing apparatus for a fluid motor having a plurality of admission valves of different capacities, the combination of means responsive to the speed of the motor for opening and closing said valves, said speed-responsive means regulating said valves in intermediate positions in response to speed, and means for determining said opening and closing in any desired order of sequence.

2. In a governing apparatus for a fluid motor having a plurality of admission valves of different capacities, the combination of means responsive to the speed of the motor for opening and closing the valves in sequence, said speed-responsive means regulating said valves in intermediate positions in response to speed, and means for changing the sequence of opening and closing of the valves.

3. In a governing system for a fluid motor, the combination of a plurality of admission valves effective to pass different volumes of motive fluid in wide open position, means responsive to the speed of the motor for opening and closing the valves in sequence, and means for changing the sequence of opening and closing of the valves while maintaining the operative relation between the valves and the first-mentioned means.

4. In a governing system for a fluid motor, the combination of a primary, a secondary and a tertiary valve, each of said valves being effective to pass a different volume of motive fluid than the others when in wide open position, means responsive to the speed of the motor, means controlled by said speed responsive means for moving the valves in an opening and a closing direction, and means for determining the order for opening and closing of the valves in any predetermined sequence while the second mentioned means is controlled by the first-mentioned means.

5. In a governing system for a fluid motor, the combination of a plurality of admission valves, at least one of said valves being effective to pass a different volume of motive fluid than the others when in wide open position, a separate fluid pressure operated relay for effecting opening and closing movement of each valve, speed responsive means, a rock shaft operatively connected to the speed responsive means, a plurality of arms on the rock shaft, a connection between each of the said arms and a controlling element of each of said fluid pressure operating relays, and means for varying the relative lengths of the connections for determining the order of opening and closing of the valves.

6. In a governing system for a fluid motor, the combination of a plurality of admission valves, at least one of said valves being effective to pass a different volume of motive fluid than the others when in wide open position, a separate fluid pressure operated relay for effecting opening and closing movement of each valve, speed responsive means, a rock shaft operatively connected to the speed responsive means, a plurality of arms on the rock shaft, a connection between each of the said arms and the controlling element of one of said fluid pressure operated relays, and means including a lost motion connection for varying the relative lengths of the connections between said arms and said controlling elements whereby the order of opening and closing of the valves may be determined.

7. In a governing system for a fluid motor, the combination of a plurality of admission valves, a speed responsive governor, a separate power actuated relay for operating each of the admission valves and controlled by the speed responsive governor, and means interposed between each of the power actuated relays and the governor for varying the time of operation of said relay with respect to the time of operation of the governor without destroying the operative relation between the governor and the relay.

8. In a governing system for a fluid motor, the combination of a plurality of admission valves, a speed responsive governor, a separate power actuated relay for operating each of the admission valves and controlled by the speed responsive governor, and means including an adjustable lost motion connection interposed between each of the power actuated relays and the governor for varying the time of operation of the relays with respect to the time of operation of the governor.

9. In a governing system for a fluid motor, the combination of two admission valves, one of said valves being constructed to pass a different volume of motive fluid than the other when in wide open position, a speed-responsive governor, connecting means between the governor and the valves whereby the governor opens said valves in succession, said means including a lost motion connection between the governor and one of said valves, and means for adjusting the extent of the lost motion.

10. In a governing mechanism for a fluid motor, the combination of a plurality of admission valves effective to pass different volumes of motive fluid in wide-open position, means responsive to an operating condition of the motor for opening and closing the valves in sequence, said means regulating the opening of the valves, and means for changing the sequence of opening and closing of the valves while maintaining the operative relation between the valves and the first-mentioned means.

11. In a governing system for a fluid motor, the combination of a plurality of admission valves of different capacities, a speed responsive governor, a separate power actuated relay for operating each of the admission valves and controlled by the speed responsive governor, each of said relays controlling the extent of opening of the associated admission valve in response to action of the governor, and means interposed between each of the power actuated relays and the governor for varying the time of operation of said relay with respect to the time of operation of the governor.

12. In a governing mechanism for a fluid motor, the combination of a plurality of admission valves of different capacities, means responsive to an operating condition of the prime mover for regulating said valves between the limits of their travels, and means for adjusting the time of operation of one of said valves with respect to the time of operation of the regulating means to an extent enabling a change in sequence of opening and closing of said one and one other of said valves, said means being operative during the operation of the governing mechanism without disassembling the same.

In testimony whereof I have hereunto subscribed my name this eighteenth day of January, 1927.

WARREN B. FLANDERS.